United States Patent [19]
O'Donnell et al.

[11] 3,921,130
[45] Nov. 18, 1975

[54] ANTI-THEFT SYSTEM EMPLOYING COINCIDENCE SWITCH WITH EASILY-CHANGED COMBINATION

[76] Inventors: William O'Donnell, 7 The Paddock, Freshfield, Lancashire; Leslie Carr, 36, Huntly Road, Liverpool 6, Lancashire, both of England

[22] Filed: Aug. 25, 1971

[21] Appl. No.: 174,862

[30] Foreign Application Priority Data
Aug. 27, 1970 United Kingdom............... 41194/70

[52] U.S. Cl................. 340/64; 180/114; 307/10 AT
[51] Int. Cl.² ................... B60R 25/10; B60R 25/04
[58] Field of Search ...... 340/64, 63; 200/43, 167 A, 200/61.93; 307/10 AT; 180/114

[56] References Cited
UNITED STATES PATENTS

| | | | |
|---|---|---|---|
| 2,146,271 | 2/1939 | Schafer | 340/63 |
| 2,242,165 | 5/1941 | Batcheller | 200/167 A |
| 2,491,968 | 12/1949 | Gilbert | 200/167 A |
| 2,583,752 | 1/1952 | Smith | 340/64 |
| 2,798,924 | 7/1957 | Kimball | 200/167 A |
| 2,892,181 | 6/1959 | Benson et al. | 340/64 |
| 3,058,092 | 10/1962 | Johnson | 340/64 |
| 3,636,485 | 1/1972 | Weathers | 340/63 |
| 3,637,037 | 1/1972 | Doland et al. | 340/64 |

*Primary Examiner*—Glen R. Swann, III
*Attorney, Agent, or Firm*—Ulle C. Linton

[57] ABSTRACT

A closure operable anti-theft system has switches normally held open by connection to closure members such as doors, or lids of vehicles or the like which switches are closed by the opening of said closure members to operate a relay and set off an alarm and/or disconnect a vehicle ignition system from its source of current and a coincidence switch is interconnected in said system which has two relatively moveable contact members which when set in one relative position break said system and when in another relative position complete said system.

1 Claim, 4 Drawing Figures

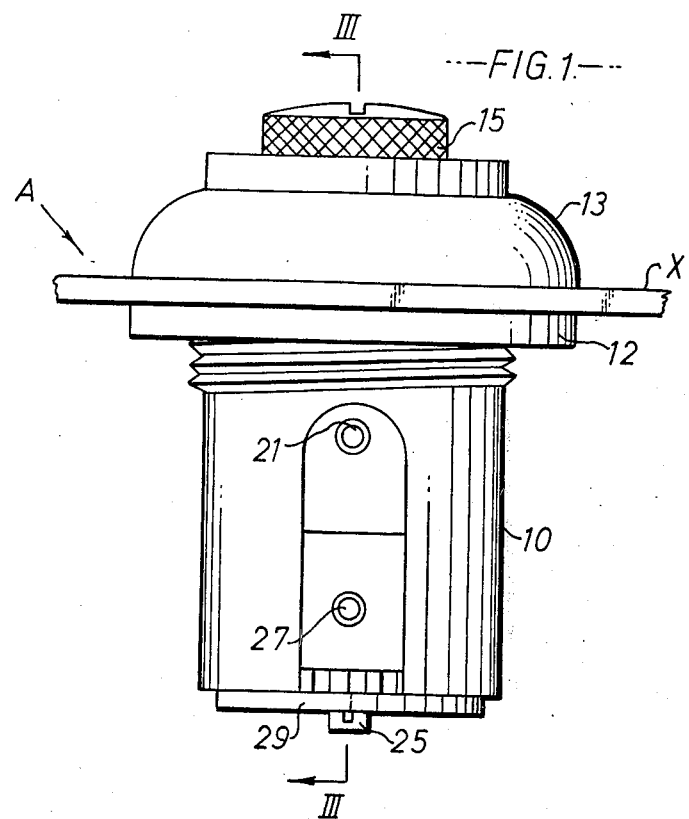

INVENTORS
WILLIAM O'DONNELL AND LESLIE CARR

ANTI-THEFT SYSTEM EMPLOYING COINCIDENCE SWITCH WITH EASILY-CHANGED COMBINATION

SUMMARY OF THE INVENTION

This invention relates to an anti-theft system, more especially (but of course not exclusively) for motor vehicles, and has for its object to provide a simple but effective system which may readily be installed by unskilled or semi-skilled persons.

According to the present invention there is provided an anti-theft system adapted to be operated by the opening of a door, lid or bonnet of a vehicle or tampering with some other part thereof and including a combination or, more properly, a coincidence switch comprising two relatively movable contact members which when set to one particular position switch the anti-theft system out of circuit and when out of said position switch the anti-theft system in circuit.

In one preferred embodiment of the invention the coincidence switch includes two relatively rotatable dials each inscribed with a series of letters or figures and each adapted to be set against a pointer or index. One dial moves a contact pin and the other dial moves a metal conducting plate for said pin, this conducting plate having an insert or part of insulating material. When the two dials are set to correspond the contact pin bears against said part of insulating material so that the combination switch is in an open condition and the anti-theft system is out of circuit. When the two dials are out of correspondence the contact pin makes contact with the metal plate to complete a circuit through the switch.

Broadly, and according to a further feature of the invention, and in one embodiment thereof, a vehicle anti-theft system comprises an electrical circuit arranged so as to incorporate and be operated by any of the courtesy light switches, or especially provided switches, associated with, say, the doors, luggage boot lid, or bonnet of a motor vehicle, a relay in said circuit having normally closed contacts in the vehicle's ignition system and normally open contacts associated with the vehicle's audible warning device, or a provided audible alarm device, and a coincidence switch having selectable positions of coincidence for putting the anti-theft system in circuit. The circuit may be powered from the vehicle's battery or a separately provided battery or cell. Said relay incorporates a resettable holding means of any suitable kind and which maintains the alarm system operative once it has been tripped. Normally said relay will be in a hidden and/or not readily accessible position.

The arrangement is such that when the coincidence switch is closed, opening of a door of the vehicle will cause operation of the relay with a consequential opening of the contacts in the vehicle's ignition circuit thereby to prevent starting of the vehicle's engine, and a closing of the contacts in the audible alarm circuit to actuate the alarm. The holding means on the relay functions to maintain the system operative, even although the door is reclosed, until such time as the relay holding device is intentionally reset. The relay may of course be arranged so as to operate other alarm devices.

Said relay holding means may, for example, be constituted by a permanent magnet, e.g. a small bar magnet, arranged so as to hold a contacts-carrying element of the relay in operative position once actuated. Said magnet is drilled through so as to receive the stem of a "reset" button positioned thereunder in operable engagement with said contacts-carrying element. Thus, by pressing upon the protruding stem of said button, the contacts of the relay may readily be reset after actuation.

Alternatively said relay holding means may be in the form of a spring operated, resettable, pawl arranged so as to engage below the contacts-carrying element of the relay once operated.

Preferably the relay holding is effected by a latch-on circuit.

The coincidence switch may comprise a first rotary member, a second rotary member, and associated therewith a rotary contact and contact plate. The arrangement is such that setting and opening of the switch, may only be effected by selecting or avoiding a particular number (or character) of a plurality of numbers (or characters) provided in respect of the rotary members of the switch.

It is of course to be understood that the invention may be employed as an anti-theft system generally in respect of any room or enclosure and that the terms 'door,' 'boot lid,' and 'bonnet' used herein are intended to include a closure for any such room or enclosure.

BRIEF DESCRIPTION OF THE DRAWING

The invention is further described with reference to the accompanying drawings which illustrate, by way of example only, one embodiment of the invention as applied to a motor vehicle.

In said drawings:

FIG. 1 is a side elevation,

DESCRIPTION OF THE INVENTION

Figure 3:
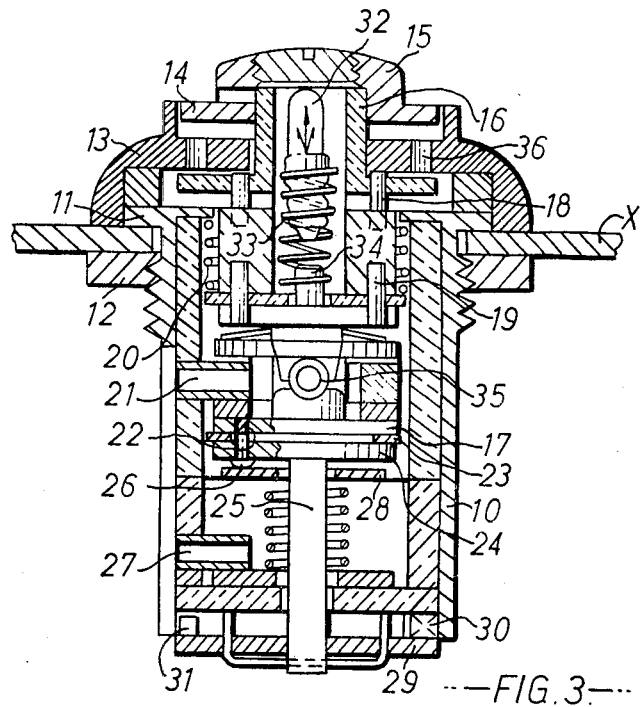
FIG. 3 is a sectional elevation on line III—III of FIG. 1, of a coincidence switch according to the invention.
Figure 2:
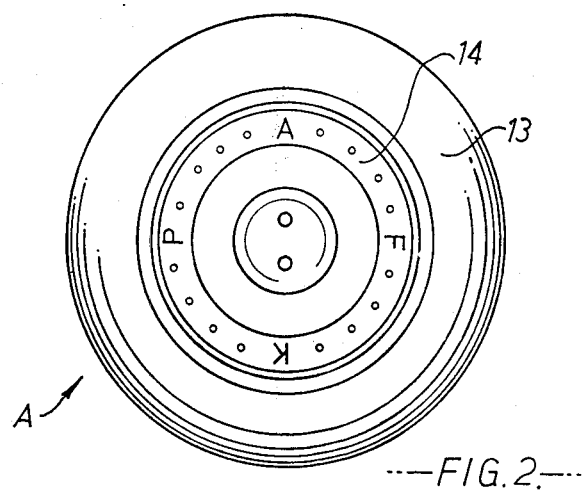
FIG. 2 is a face view.

The coincidence switch A shown in FIGS. 1–3 comprises a metal housing 10 which is tubular in form and is securable in an aperture of a vehicle's bodywork X by means of a flange 11 of said housing and a draw-up nut 12 screwed onto said housing which is externally screw threaded. A front cover 13 is secured over the front end of the housing 10.

Rotatably positioned in the front cover 13 is a dial 14 formed with the serrated knob 15 for its rotation. The dial 14 is inscribed circumferentially with (in this instance) the letters A to T. These letters can be set selectively by clockwise rotation of the dial 14 against an index or pointer not shown but which is conveniently inscribed on the cover 13.

A flanged neck 16 is secured to the dial 14, for rotation therewith, and is drivingly connected by a coupling arrangement to a metal disc 17. The coupling arrangement just referred to includes pairs of slidable pins 18 and 19 so that whilst rotation of the dial 15 is transmitted to the disc 17 axial movement of the dial is possible. A spring 20 urges the dial 14 inwardly with respect to the cover 13. The metal disc 17 is connected in the circuit of the anti-theft system (hereinafter described) by means of a contact or terminal device 21. The metal disc 17 has a small insert 22 of insulating material.

Positioned below the metal disc 17 and spaced slightly therefrom by an insulating washer 23, is a disc 24 of insulating material mounted on a stem 25. The disc 24 carries a metal contact pin 26 connected electrically to a further contact or terminal 27 in the circuit of the anti-theft system. The contact pin 26 is urged against the disc 17 by means of a spring-loaded plate 28.

The stem 25 and thereby the disc 24 is connected, for rotation, to a rotatable setting dial 29 inscribed circumferentially, in an anti-clockwise direction, with the letters A to T. These letters can be set selectively against an index or pointer (not shown) provided for example on the adjacent portion of the casing 10.

The casing 10 is provided internally with teeth 30 adapted to engage with a tooth or peg 31 on the dial 29 so as to hold the dial in its set position. To change the setting of the dial 29 said dial is temporarily pulled outwardly.

An electric lamp 32 is provided within the flanged collar 16 and is supported by means of a spring 33 over a contact 34 provided with an electric terminal connection 35. Return is provided via the body X and spring 33. The cover 13 is provided with twenty apertures 36 corresponding with the letters inscribed on the dial 14 and the flanged neck 16 is made of transparent or translucent plastics material so that the lamp 32 can illuminate the dial which is also made of a transparent or translucent material.

In using the coincidence switch above described, a letter is selected on the dial 29, and said dial is temporarily pulled out and said letter set against the index for that dial. The dial 14 is set to the corresponding letter. The contact 26 is then in register with the insulated insert 22 and the circuit of the anti-theft system is broken at the coincidence switch and will not be set in operation by the normal opening of the vehicle door or the boot of the vehicle.

A person leaving the vehicle and wishing the anti-theft system to take over protection thereof, after securing the door and the boot, turns the dial 14, after memorising or noting the setting on dial 29, so that the contact 26 is moved out of register with the insulated insert 22. Thus the switch is set in an 'on' position and the anti-theft system will be put into operation immediately there is unauthorized opening of the vehicle door or boot.

On returning to the vehicle, the driver or other authorized person will, before attempting to open the door or boot, turn the dial 14 so that the selected letters on the dials 14 and 29 again coincide and the contact 26 registers with the insulated insert 22. Thus, when the door or the boot is opened there will be no operation of the anti-theft system the circuit thereof having been broken in the coincidence switch.

To assist adjustment of the dial 14 to the appropriate letter, said dial may be pressed inwardly against the spring arrangement provided, so that the lamp 32 engages its contact 34 and is illuminated.

Figure 4:
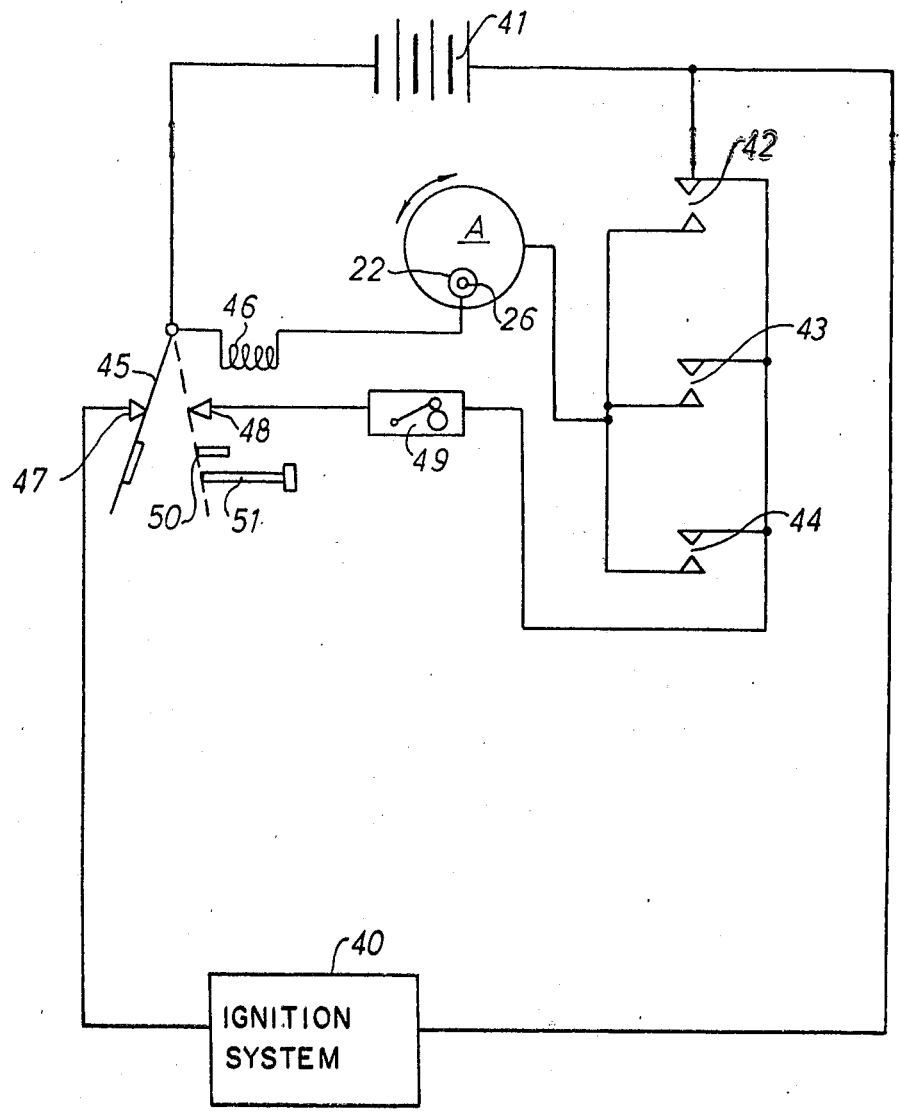
FIG. 4 is a diagram of an electrical circuit incorporating a coincidence switch as illustrated in FIGS. 1–3.

In FIG. 4, 40 indicates diagrammatically the ignition system and 41 the battery of a motor vehicle.

For the purpose of the present invention switch or contact devices 42, 43 and 44 are associated respectively with the vehicle doors, boot lid and bonnet of the vehicle. The switches 42, 43 and 44 are normally open but are closed when a door, or the boot lid or bonnet of the vehicle is opened.

A normally closed relay 45 is connected in series with the ignition system 40, the coil 46 of said relay being connected in series with the coincidence switch A and with the switches 42, 43 and 44.

In addition to a contact 47, connected to the ignition system 40, the relay 45 has a normally open contact 48 connected in series with an audible alarm 49.

The relay 45 also has a hold-on means 50 and a reset button or switch 51.

As shown in the diagram, the anti-theft system is in an inoperative condition with the insulated insert 22 of the coincidence switch being in register with the contact pin 26 thereof.

As previously stated, before leaving a vehicle the owner or other authorised person adjusts the coincidence switch so as to move the insulated insert 22 out of register with the contact pin 26. If then an attempt is made to open a door of the vehicle or the boot lid or bonnet, the switch, 42, 43 or 44, as the case may be, closes and the relay coil 46 is energised. This operation of the relay 45 opens the contact 47, to isolate the ignition system 40 from the battery 41 and closes the contact 48 so as to set the alarm 49 in operation.

Even if the relay coil 46 should subsequently be de-energised by, for example, the re-closing of the vehicle door and opening of the switch 42, the ignition system 40 will still be isolated and the alarm 49 will continue to operate because the contact 48 is maintained closed by the hold-on means. It is necessary to operate the push button 51 (or switch of the latch-on circuit) to return the relay to its normal condition.

We claim:

1. An anti-theft system comprising an electric circuit which includes at least one switch to be operated by a closure member, a relay having a coil to be energized by operation of said switch and having contact means with an alarm whereby operation of said relay will cause operation of said alarm, and a single manually operable coincidence switch having selectable positions of coincidence in circuit between said one switch and said relay and having a particular position of coincidence in which it renders the anti-theft system inoperative, said coincidence switch including two manually rotatable dials each having corresponding characters for setting against datum points, one of said dials being positioned externally of said coincidence switch and intended for access externally of the enclosure to be protected, a contact pin connected to one of said dials for movement therewith, a circular contact plate connected to the other of said dials for rotation therewith and being in contact with said contact pin, said plate having a small portion of insulating material whereby when said dials are set to correspond said contact pin bears against said portion of insulating material so that said coincidence switch is in an 'off' condition, whereas when the setting of said two dials do not correspond said contact pin makes contact with said contact plate to complete a circuit through the switch and render the system operative, said coincidence switch comprising a tubular housing, a front cover positioned on said housing, said one of said dials being rotatably positioned in said front cover, means for manually rotating said one dial whereby any character of said dial can be set against said datum point, said plate being a metal disc having said small portion of insulating material therein and being drivingly connected with said one of said dials, said metal disc being connected in the electrical circuit of the anti-theft system by means of a terminal device associated therewith, a disc of insulating material carrying said contact pin which is metal and is connected electrically by means of a further terminal device in the circuit of the anti-theft system, a spring loaded plate urging said contact pin into rubbing contact with said metal disc, a stem on said disc carrying said contact pin, said stem being connected with the other of said dials being positioned at the opposite end of said housing to said one dial, and means for locating said other dial in any selected position of adjustment.

* * * * *